United States Patent

[11] 3,607,318

[72] Inventor Paul F. Warner
Phillips, Tex.
[21] Appl. No. 884,027
[22] Filed Dec. 10, 1969
Division of Ser. No. 658,044, Aug. 3, 1967, Pat. No. 3,522,314
[45] Patented Sept. 21, 1971
[73] Assignee Phillips Petroleum Company

[54] POLISHING COMPOSITION FOR METAL SURFACES COMPRISING MERCAPTO THIOETHERS AS METAL TARNISH INHIBITORS
6 Claims, No Drawings
[52] U.S. Cl. .................................................. 106/3, 106/287
[51] Int. Cl. ........................................................ C08h, C09d, C09g
[50] Field of Search ........................................... 106/3-11, 2, 287 S; 260/609; 21/2.5

[56] References Cited
OTHER REFERENCES

Synder et al., " J. Amer. Chem. Soc.," Vol. 69 (1947), pp. 2675- 2677.

*Primary Examiner*—Julius Frome
*Assistant Examiner*—Joan B. Evans
*Attorney*—Young and Quigg ABSTRACT: The compound represented by $$HS-R-O-R-S-R'$$

wherein each R is selected from saturated aliphatic hydrocarbon radicals having 1 to 5 carbon atoms and R' is selected from alkyl, cycloalkyl and alkaryl radicals having 8 to 20 carbon atoms, is prepared by the reaction of a dimercaptan with a monoolefin. The compounds have utility with paints, sealing compounds and silver or copper polish compositions. A preferred compound, 3-mercaptopropyl 3-(*t*-dodecylthio)propyl ether, is a very effective tarnish inhibitor for silver.

POLISHING COMPOSITION FOR METAL SURFACES COMPRISING MERCAPTO THIOETHERS AS METAL TARNISH INHIBITORS

RELATED APPLICATIONS

This is a divisional application of copending application having Ser. No. 658,044, filed Aug. 3, 1967 now U.S. Pat. No. 3,522,314.

BACKGROUND OF THE INVENTION

This invention relates to a heavy mercaptan compound. In one aspect, it relates to a mercaptan compound having very little odor. In another aspect, it relates to a mercaptan compound as a tarnish inhibitor for silver. In another aspect, it relates to a silver polishing compound containing a heavy mercapto ether as a tarnish inhibitor.

SUMMARY OF THE INVENTION

The novel compound of my invention has the general formula represented by

HS—R—O—R—S—R' wherein each R is selected from saturated aliphatic hydrocarbon radicals having one to five carbon atoms and R' is selected from alkyl, cycloalkyl and slkaryl radicals having eight to 20 carbon atoms.

The compounds falling within this generic formula have very little odor, and display good tarnish inhibition when applied to tarnishable metals such as silver and copper.

DESCRIPTION OF THE PREFERRED EMBODIMENTS

The novel compounds of my invention are conveniently prepared by the interreaction of a monoolefin having from eight to 20 carbon atoms with a dimercaptan having the generic formula HS—R—O—R—SH, where the R groups are as defined above.

The monoolefins useful for the practice of my invention include not only the monoolefinic straight and branched chain hydrocarbons, but cycloalkyl and aromatic compounds having olefinic side chains as well. The straight and branched chain aliphatic hydrocarbons are preferred.

The reaction is conveniently conducted in the presence of a boron trifluoride-phosphoric acid catalyst. The catalyst composition is prepared by treating orthophosphoric acid of variable water content with anhydrous boron fluoride until complete saturation has been realized. With 100 percent phosphoric acid substantially one mole of boron fluoride is absorbed per mole of acid, while in the case of aqueous solutions both the phosphoric acid and the water absorb boron fluoride approximately mole for mole. No theories are advanced as to the chemistry involved in the preparation of the catalyst, but it is presumed that a type of chemical combination often referred to as a complex or addition compound or compounds has resulted. Where 100 percent phosphoric acid is concerned, the empirical representation of its complex boron fluoride is $H_3PO_4 \cdot BF_3$. In the same manner, catalysts prepared from aqueous phosphoric acid and boron fluoride might be considered to be a mixture of the components $H_3PO_4 \cdot BF_3$ and $H_2O \cdot BF$.

The phosphoric acid employed in preparing the preferred catalyst may be in concentrated form, ranging from the 85 percent acid of commercial grade up to about 100 percent $H_3PO_4$; or aqueous solutions containing as little as 20 to 40 percent $H_3PO_4$ may be employed. For most applications the moderately concentrated acid is ordinarily preferred. The readily available 85 percent commercial acid yields a very satisfactory catalyst when saturated with boron fluoride. While orthophosphoric acid is preferred in preparing the catalysts of this invention, other oxygen-containing acids of phosphorous, such as, for example, phosphorus acid ($H_3PO_3$) in aqueous solution, may also be used, although less active catalysts usually result.

Compounds exemplary of those with the generic formula are:

mercaptomethyl-(t-dodecylthio)methyl ether 
5-mercaptoamyl 5-(t-dodecylthio)amyl ether
4-mercaptobutyl 4-(n-octylthio)butyl ether
2-mercaptoethyl 2-(n-eicosylthio)ethyl ether
3-mercaptopropyl 3-(t-dodecylthio)propyl ether The compound having the highest current utility among those within the generic formula is 3-mercaptopropyl 3-(t-dodecylthio)propyl ether, and the preparation and utility of the generic compound of this invention will be discussed below with relation to that specific currently preferred compound.

The preferred compound of my invention, 3-mercaptopropyl 3-(t-dodecylthio)propyl ether, is produced by reacting propylene tetramer with bis-3-mercaptopropyl ether. The reaction conveniently takes place at room temperature. The two reactants are charged to a reactor in a mole ratio of from about 0.5 to 1 to 2 to 1, and catalyst is added in incremental portions until reaction ceases.

The compounds of my invention find utility in the many known areas where mercaptans are usable, and particularly where the normal odor associated with mercaptan compounds is objectionable. Because of the very low odor of the compounds of this invention, they can be used in conjunction with paints, sealing compounds, silver and other metal polish compositions, and so forth. The compounds find particular utility in making of silver and copper polish compositions. These compounds not only have the very low odor necessary for a successful polish composition, but have excellent tarnish inhibiting properties. For such an application, the compounds would normally be mixed with a light abrasive agent such as chalk, silica or alumina, a diluent such as water or a lower alcohol, and a suspending agent. Perfumes may be added if desired. Such a composition would usually be comprised of from about 1 to about 50 percent, preferably from about 1 to about 40 percent, of the compound of my invention.

While the antitarnish agents of the invention can be used alone, it is generally preferred for household use to incorporate such agents into a paste or liquid composition. Such a polishing composition will remove old tarnish through incorporation of a light abrasive agent, and will simultaneously treat the clean surface with the antitarnish agent to prevent future tarnish.

While the compounds can e directly applied to previously cleaned metal, in the preferred embodiment, the anti-tarnish agent will be compounded into a polishing composition. As indicated above, such a composition will include a finely-divided abrasive polishing agent which can be either natural or synthetic abrasive materials. Additionally, a satisfactory polishing composition will also include a diluent. The amount of diluent will depend upon the consistency of the polishing composition desired. In general, a polar solvent can be used as the diluent with water or a lower alcohol being preferred. Sometimes it is desirable to add a perfuming agent to polish compositions which are intended for home use. Such agents are readily commercially available. In order to prevent the abrasive matter from settling out of suspension, a small quantity of a suspending agent is generally employed. Such agents are well known to those skilled in the art.

For example, a silver or copper polish composition can be compounded with the following general ranges: 1 to 50 percent of a mercaptothio ether, e.g., 3-mercaptopropyl 3-(t-dodecylthio)propyl ether; 5 to 98 percent abrasive; 0 to 5 percent odorizer; and 0 to 1 percent suspending agent. Sufficient diluent is then added to form a composition of the desired consistency.

EXAMPLE I

A synthesis run was made to produce 3-mercaptopropyl 3-(t-dodecylthio)propyl ether by the reacton of propylene tetramer and bis-3-mercapto-propyl ether. The reaction was conducted in a 1-liter, three-neck mixing flask equipped with a reflux condenser, motor-driven stirrer and thermometer. The olefin (252 grams, 1.5 moles) and dithiol (316 grams, 1.9 moles) were added to the flask. The flask was maintained at atmospheric temperature, and portions of boron trifluoride phosphoric acid catalyst were added incrementally over the entire run for a total addition of 33.2 grams of catalyst. At the end of the run, the crude product was washed twice with warm water and concentrated by vacuum distillation. Chromatographic analysis indicated that the 3-mercaptopropyl 3-($t$-dodecylthio)propyl ether was approximately 90 percent pure. The total yield, based upon dithiol charged, was about 32 percent.

EXAMPLE II

Clean silver specimens were treated with 3-mercaptopropyl 3-($t$-dodecylthio)propyl ether and with $n$-octadecyl mercaptan. These specimens, along with an untreated specimen, were exposed for one week in a laboratory having a high sulfur content air. At the end of the week, the untreated specimen was heavily tarnished. The specimen treated with $n$-octadecyl mercaptan had a light tan coloration and had lost its luster. The specimen treated with 3-mercaptopropyl 3-($t$-dodecylthio)propyl ether showed very light traces of tan in some areas, but remained quite lustrous.

Various catalysts of the Friedel-Crafts type, in addition to the boron trifluoride-phosphoric acid catalyst described, may be used in the practice of the invention. Such catalysts may be aluminum chloride, ferric chloride, and sulfuric acid.

I claim:
1. A silver and copper polishing composition comprising
   a. a compound represented by
   $$HS-R-O-R-S-R'$$
   wherein each R is selected from saturated aliphatic hydrocarbon radicals having one to five carbon atoms and R' a straight or branched chain aliphatic hydrocarbon radical having eight to 20 carbon atoms, said compound being present in an amount from 1 to 50 percent by weight,
   b. an abrasive present in an amount from 5 to 98 percent by weight,
   c. a diluent present in an amount from 1 to 90 percent by weight,
   d. an odorizer present in an amount from 0 to 5 percent by weight, and
   e. a suspending agent in an amount of from 0 to 1 percent by weight.
2. The composition according to claim 1 wherein the compound is 3-mercaptopropyl 3-($t$-dodecylthio)propyl ether.
3. The composition according to claim 1 wherein the compound is mercaptomethyl-($t$-dodecylthio)methyl ether.
4. The composition according to claim 5 1 wherein the compound is 5-mercaptoamyl-5-($t$-dodecylthio)amyl ether.
5. The composition according to claim 1 wherein the compound is 4-mercaptobutyl-4-($n$-octythio)butyl ether.
6. The composition according to claim 1 wherein the compound is 2-mercaptoethyl-2-($n$-eicosylthio)ethyl ether